United States Patent [19]

Gruenewald et al.

[11] Patent Number: 4,770,490
[45] Date of Patent: Sep. 13, 1988

[54] FILAMENT REINFORCED TAPE

[75] Inventors: Larry E. Gruenewald, Grant Township, Washington County; Donald J. Klassen, Lake Elm, both of Minn.

[73] Assignee: Minnesota Mining and Manufacturing Company, St. Paul, Minn.

[21] Appl. No.: 894,193

[22] Filed: Aug. 7, 1986

[51] Int. Cl.⁴ .................. G02B 6/44; B65H 69/02; D04H 1/04
[52] U.S. Cl. .................. 350/96.23; 428/295; 350/96.10; 156/158
[58] Field of Search ........... 156/158, 172, 180, 244.12, 156/244.13, 244.22; 428/295; 350/96.23

[56] References Cited

U.S. PATENT DOCUMENTS

| | | | |
|---|---|---|---|
| 2,750,030 | 6/1956 | Tierney | 206/59 |
| 2,750,314 | 6/1956 | Bemmels | 154/53.5 |
| 2,750,315 | 6/1956 | Tierney | 154/53.5 |
| 2,750,316 | 6/1956 | Bemmels | 154/53.5 |
| 3,391,050 | 7/1968 | Nebesar | 161/143 |
| 3,616,165 | 10/1971 | Nishi | 161/143 |
| 4,019,940 | 4/1977 | Hood | 156/180 |
| 4,241,979 | 12/1980 | Gagen et al. | 350/96.23 |
| 4,355,865 | 10/1982 | Conrad et al. | 350/96.23 |
| 4,454,192 | 6/1984 | Suzuki | 428/294 |
| 4,490,427 | 12/1984 | Grant et al. | 428/107 |
| 4,679,898 | 7/1987 | Grooten | 350/96.23 |

OTHER PUBLICATIONS

Glass Filament Tapes for Fiber Optic Cables, Packaging Systems Division/3M, Oct. 1984.

Primary Examiner—William L. Sikes
Assistant Examiner—Akm E. Ullah
Attorney, Agent, or Firm—Donald M. Sell; David L. Weinstein

[57] ABSTRACT

Tape reinforced by means of filaments comprising a backing and a plurality of yarns comprising a multiplicity of filaments adhered to at least one major surface of said backing by means of a layer of an adhesive. The yarns are disposed essentially parallel to each other along the machine direction of the tape. The yarn-bearing surface of the backing is coated with a polymeric material that both overcoats the filaments and detackifies the residual adhesive between the yarns. The yarns are preferably elliptical in cross-section, with the major axis thereof being essentially parallel to the plane of said backing. In a second embodiment, the tape is reinforced by individual filaments adhered to the backing by means of a layer of adhesive.

One advantage of the tape of this invention is that the polymeric material makes it possible for the tape to be applied to optical fiber cable from conventional apparatus without having adhesive from the tape stick to the apparatus. A second advantage is that the polymeric material strengthens the yarns so as to minimize unraveling thereof.

19 Claims, 1 Drawing Sheet

FILAMENT REINFORCED TAPE

BACKGROUND OF THE INVENTION

This invention relates to tape, in particular, tape reinforced by means of filaments.

One embodiment of a fiber optic cable comprises, in part, one to 24 (or more) optical fibers, each of which is usually contained in a loose tube made of polymeric material for protection. Because optical fibers are often used in environments that are subject to high levels of moisture, hydrophobic gels are generally applied to the surface of the optical fiber-containing tubes. These gels are typically applied just prior to the time a protective jacket is extruded over the bundle of optical fibers. The basic element of this technology, the optical fiber, is a small, transparent filament that guides optical energy in the form of visible light or infrared radiation. This filament consists of an inner transparent silica (glass) core and outer transparent material, commonly referred to as the cladding. Light is guided in the core by reflections at the core-cladding interface. These reflections occur because of a difference in the refractive index between the higher index core and lower index cladding. Reflections of this type, between high and low index media, require that the interface be smooth, so that attenuation of the optical signal, i.e. decrease in signal transmission, is minimized.

The individual optical fibers of the fiber optic cable are generally bound by tapes or yarns. Yarns currently used in binding bundles of optical fibers frequently attenuate the optical signal by placing high stress at various points on individual optical fibers. In particular, attenuation of the signal occurs because localized pressure at the point where the yarn contacts the loose optical fiber-containing tube causes the tube to contact the optical fiber, which further causes microbending of the optical fiber. This microbending phenomenon further causes an altering of the reflection pattern in the fiber. While tapes used to bind optical fibers do not adversely affect the strength of the optical signal, they are not sufficiently strong to withstand the environment in which the cables are used. Because of this inherent lack of strength of binding tapes, most tapes are wrapped around bundles of optical fibers so as to have the edges of the tape overlap. Although this overlapping tends to compensate for the weakness of the tape, it gives rise to an additional problem, i.e. because of the overlapping of the tape, the aforementioned hydrophobic gel cannot be applied directly to the surface of the optical fiber-containing tubes, resulting in a higher probability of moisture damage to the optical fibers.

It would be desirable to develop tapes for binding optical fibers that could both replace the yarns that cause the high localized stress on the optical fibers and be sufficiently strong to withstand the environment in which optical fibers are used.

SUMMARY OF THE INVENTION

This invention involves filament reinforced tapes which can be used to bind fiber optic cable components. The tape, being a ribbon-like article, delocalizes the binding stress on the cable components, thus reducing attenuation of optical signals. The filaments provide the tape with sufficient strength to avoid being damaged in the harsh environments in which fiber optic cables are used.

The tape of this invention comprises a backing having on one major surface thereof a multiplicity of filaments, preferably twisted into yarns, adhered to said backing by means of an adhesive, preferably a pressure-sensitive adhesive. The filament-bearing surface of the tape is treated with a polymeric material, e.g. a blend comprising a block copolymer rubber and an end block stabilizing resin, in order to (1) detackify exposed, residual adhesive, and (2) coat the filaments. It is important that the exposed, residual adhesive, i.e. adhesive that is not involved in bonding the filaments or yarns to the backing, be detackified in order to prevent this residual adhesive from causing the tape to stick to guides or eyelets associated with the automated equipment that is used to aid in coiling the tape around bundles of optical fibers.

It is important that the filaments be coated with the polymeric material so that the yarns not fray or unravel. The yarns preferably are elliptical in cross-section, with the major axis thereof essentially parallel to the plane of the backing. This configuration insures that the tape will delocalize stress on the optical fibers in the tube, thus reducing the potential for damage of the cable resulting from bending which often accompanies installation of cable.

The tape of this invention is useful for bundling or imparting strength to communication cables, e.g. optical fibers, copper wire. The improvements that are offered by this invention to fiber optic cable can be noted in the areas of cable manufacture, cable installation, and cable handling in that filament-reinforced tape provides much less localized stress on optical fibers than does the yarn typically used to bind optical fibers.

DETAILED DESCRIPTION

Figure 1:
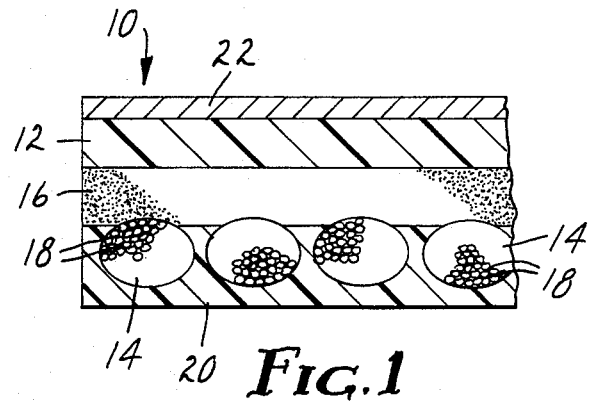
FIG. 1 is a vertical sectional view of the preferred embodiment of the tape of this invention.

Referring to FIG. 1, the preferred embodiment of a filament-reinforced tape 10 comprises a backing 12 having bonded to one major surface thereof a plurality of yarns 14 by means of a layer of adhesive 16. The yarns 14 comprise a plurality of filaments 18. The filament-bearing surface of the backing is coated with a layer of polymeric material 20 so as to overcoat both the filaments 18 and the portions of the adhesive layer 16 that contain residual adhesive. The tape may also bear an optional low adhesion backsize layer 22. In FIG. 1, only a portion of the filaments of 18 of yarns 14 are depicted. It is to be understood that the elliptically-shaped areas which represent yarns 14 are comprised of many more small circular areas which represent filaments 18 than are depicted, i.e. virtually all of the elliptically-shaped areas are filled by small circular areas.

The term "filament" as used herein refers to individual filaments or monofilaments. The term "yarn" as used herein means the cable or rope made by combining a multiplicity of filaments. The term yarn includes yarn free of twist or twisted into a ropelike mass. Although individual filaments, i.e. monofilaments, can be used to provide the reinforcement to the backing (see FIG. 2), it is preferable to use yarns comprising a multiplicity of filaments because yarns are easier to apply to the backing than are individual monofilaments. Accordingly, the description of the invention will be concerned primarily with yarns. It should be understood, however, that individual filaments can be used in lieu of yarns. The term "residual adhesive" as used herein refers to adhesive in the adhesive layer 16 that is not in contact with the yarns or filaments. Residual adhesive is not needed for any purpose.

The backing 12 can be any polymeric film material. Polymeric materials suitable for the backing include polyesters; polyolefins, such as polyethylene; ethyl cellulose film; cellulose esters such as cellulose acetate, cellulose acetate butyrate, cellulose propionate; polyvinylidene chloride-vinyl chloride and/or acrylonitrile polymers such as saran; vinyl chloride polymers such as copolymers of vinyl chloride and vinyl acetate; polyfluoroethylenes such as polytetrafluoroethylene and polytrifluorochloroethylene; polyvinyl alcohol; polyamides such as nylon; polystyrenes such as the copolymers of styrene and isobutylene; regenerated cellulose; benzyl cellulose cellulose nitrate; gelatin; glycol cellulose; flexible acrylate and methacrylates; rubber films; chlorinated rubber; cyclized rubber; rubber hydrochloride; starch films; urea aldehyde films; polyvinyl acetal; polyvinyl butyral.

If woven or non-woven fibrous backings are used they may be fibrous webs composed of polyamide, asbestos, cotton, linen, rayon, felt, matter glass, glassine, Japanese tissue, leather, a mixed rubber-fiber backing, paper, impregnated paper such as paper impregnated with rubbery masses similar to pressure-sensitive adhesives, coated paper, treated paper such as internally bonded, etherified, or parchmentized paper, rope paper, oriented paper, non-woven fibers bonded at intervals adhesively and any other coated, impregnated, or treated fibrous woven or non-woven backings.

The thickness of the backing can range from about 0.0127 mm to about 0.127 mm. The backing should be sufficiently flexible so that it can be wound into a roll. The elasticity of the backing should be greater than that of the individual filaments because the backing will have to stretch slightly when the tape is being wrapped around the bundle of optical fibers, whereas the filaments will not be forced to undergo any elongation during the wrapping process. The tensile strength of the backing will typically be less than that of the individual filaments.

A layer of adhesive 16 is required to bond the yarns 14 to the backing 12. Adhesives that can be used to bond the yarns to the backing include, for example, pressure-sensitive adhesives and hot-melt adhesives. Pressure-sensitive adhesives are preferred for the present invention. Pressure-sensitive adhesives are well-known to those of ordinary skill in the tape art and are described in *Encyclopedia of Polymer Science and Technology*, Vol. 1, Interscience Publishers (New York: 1964), pp. 445–550. Representative examples of pressure-sensitive adhesives suitable for this invention include acrylates, natural rubber-tackifying resins, and block copolymer rubber-tackifying resins. If hot-melt adhesives are used, their melting temperature must not exceed the melting point of the filaments which are the components of the yarn.

A plurality of yarns 14 are adhered to the backing 12 by means of the adhesive layer 16. Preferably, the yarns are placed in substantially parallel arrangement along the machine direction of the tape. The spacing between adjacent parallel yarns is generally from 0.5 to 5 mm with best results generally being obtained with spacings of 1 to 3 mm, preferably about 2 mm. It is generally desired that the spacing between yarns should be substantially uniform and constant but some variations may occur during manufacture and are tolerable. If the tape is 6 mm wide, the yarns must not be more than 2 or 3 mm apart, so as to ensure that the tape contains at least 2 or 3 of the yarns. A plurality of yarns is required in order to avoid the imposition of localized stress, such as is common when individual yarns are used to bind bundles of optical fibers.

The filaments 18 which are employed to form the yarns 14 are preferably of high tensile strength and moderate elasticity. The tensile strength of the filaments is preferably at least about 35,000 lb/sq. in. (2461 kg/sq. cm.), as determined in accordance with ASTM D 885 (1985). The elasticity of the filaments is preferably at least about 10% elongation at break as determined in accordance with ASTM D 885 (1985). Representative materials suitable for the filaments 18 include cellulose esters, e.g. cellulose acetate, cellulose propionate; polyamides, e.g. nylon; polyesters; polyolefins; rayon; vinylidene chloride interpolymers, e.g., with vinyl chloride and/or acrylonitrile; cotton threads; linen threads; silk threads.

Filaments 18 that are made of polyester, e.g. polyethylene terephthalate, are preferred, as yarns made therefrom have been found to provide a more secure, tougher tape. The yarns 14 may be composed of one filamentous material or of several filamentous materials twisted or compounded together and several types of filaments may be used in one and the same product. A preliminary coating may be applied to the yarn if desired to increase the adhesion thereof to the layer of adhesive. It is preferred that the yarns 14 have an elliptical cross-section, with the major axis thereof parallel to the plane of the backing. This orientation provides additional delocalization of binding stress on the cable components. The diameter of the minor axis of the yarn can range from about 0.05 mm to about 0.127 mm. The diameter of the individual filaments can range from about 0.005 mm to about 0.015 mm.

Tapes 10 are typically supplied in a roll to the manufacturer of the fiber optic cable. In the automated apparatus used to helically wind the tape about the bundle of optical fibers, the tape is unwound from the roll and guided in the proper direction toward the bundle by means of metal eyelets. It would present a problem in applying the tape of this invention around a bundle of optical fibers if the adhesive 16 used to adhere the yarns 14 to the backing 12 caused the tape to stick to the eyelets used to guide the tape in its path to the bundle. This is particularly true when a pressure-sensitive adhesive is used. In order to eliminate this problem, it is desired to detackify the residual adhesive on the backing. It has been discovered that detackification can be effected by applying, over the surface of the backing bearing the yarns, a coating of polymeric material 20 that has a low coefficient of static friction. The amount of polymeric material should be sufficient to detackify the residual adhesive and should preferably be sufficient to overcoat the filaments 18 of which the yarn 14 is comprised. Polymeric materials that are suitable for providing a low friction, slippery, tack-free character to the filaments and the area of the backing containing residual adhesive include styrene-isoprene-styrene block copolymers, styrene-butadiene-styrene block copolymers, and natural rubber, in combination with end block stabilizing resins or substituted phenolic resins. Optionally, the polymeric materials can be combined with such materials as glass beads or calcium carbonate particles in order to provide a low friction surface. It is preferred that the coefficient of static friction of the yarn-bearing surface of the backing 12 be equal to or less than 2.8, as measured according to ASTM D 1894 (1978). The coating weight of the polymeric material preferably ranges from about 3 to about 6 grains/4 in.×6 in. (from about $12.5 \times 10^{-4}$ to about $25 \times 10^{-4}$ g/cm$^2$). The viscosity of the polymeric material should be sufficiently low so that it can flow into the yarns and coat the individual filaments thereof and sufficiently high to remain coated on the individual filaments and the areas containing residual adhesive. Preferably the viscosity of the polymeric material ranges from about 1000 to about 4000 cps at 25° C.

The tape is generally supplied to the user unsupported, for instance as a reel, but if desired may be supplied to the user while supported on a release liner. The tape can be of conventional width (13 to 50 mm or more) or can be narrower. Thus, the tape can easily be less than 13 mm in width and typically can be 3 to 6 mm in width.

The total weight of the tape can be similar to the total weight of conventional thermally adhesive or pressure-sensitive adhesive tapes, generally above 10 g/m$^2$ but below 80 g/m$^2$, preferably 20 to 50 g/m$^2$.

The yarns 14 generally provide from 20 to 80% of the weight of the tape, with the backing 12, adhesive layer 16, and coating of polymeric material 20 providing the remaining 80 to 20% of the weight. For most purposes the yarns provide 30 to 70% by weight of the tape. Tapes formed of from 30 to 50% by weight yarns 14 and 70 to 50% by weight backing, adhesive layer, and coating of polymeric material are generally preferred for most binding applications, but for uses where maximum permeability and/or maximum longitudinal strength are required, tapes containing from 70 to 80% by weight of the yarns 14 may be preferred.

The tape 10 of this invention can be made by the following procedure. Yarns 14 are provided by forming individual filaments 18 into yarns, typically comprising from about 50 to 400 filaments each, according to conventional methods. An optional low adhesion backsize 22 is coated onto one major surface of the backing 12 and a layer of adhesive 16 is coated onto the other major surface of the backing 12. Low adhesion backsizes are known to one of ordinary skill in the art and are described, for example, in U.S. Pat. Nos. 2,532,011, 2,607,711, and 3,318,852, incorporated herein by reference. As stated previously, it is preferred to use a pressure-sensitive adhesive. A plurality of yarns 14 is then laminated to the surface of the backing 12 that bears the adhesive 16 such that the yarns 14 are essentially parallel. After the yarns are laminated to the backing, a coating of polymeric material 20 is then applied over the yarns 14 and areas of the adhesive layer 16 comprising residual adhesive. As stated previously, the amount of polymeric material should be sufficient to detackify the residual adhesive and should preferably be sufficient to coat the filaments 18 of which the yarn 14 is comprised. The backing is then slit and wound in a conventional manner to form rolls of tape. If a sufficient amount of polymeric material has been applied to the filaments 18, the yarn 14 will not unravel when the backing is slit and wound.

Figure 2:
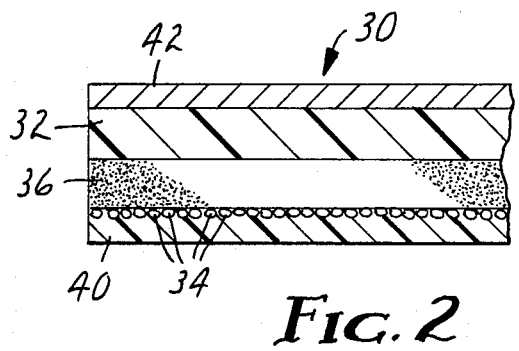
FIG. 2 is a vertical sectional view of a second embodiment of the tape of this invention.

In a second embodiment of the tape of this invention, as shown in FIG. 2, the tape 30 comprises a backing 32 having bonded to one major surface thereof a plurality of filaments 34 by means of a layer of adhesive 36. The filament bearing surface of the backing is coated with a layer of polymeric material 40 to overcoat both the filaments 34 and the areas of the adhesive layer 36 that are not in contact with the filaments 34. The tape may bear an optional low adhesion backsize layer 42.

In this embodiment, the backing 32, adhesive layer 36, filaments 34, and layer of polymeric material 40 are essentially identical to those described in the embodiment shown in FIG. 1. The major differences between the embodiments of FIG. 1 and FIG. 2 reside in the spacing of the filaments relative to the spacing of the yarns and the shape of the filaments relative to the shape of the yarns. The filaments are essentially parallel and the space between adjacent filaments is preferably kept to a minimum. The filaments have an essentially circular cross-section.

Figure 3:
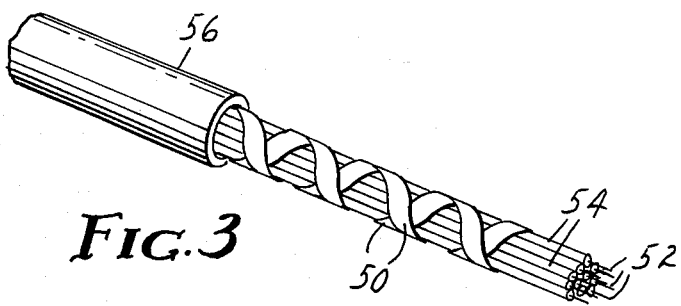
FIG. 3 is a view of the tape wrapped around a bundle of optical fibers.

FIG. 3 shows the tape 50 of this invention wrapped around a bundle of optical fibers 52. Each optical fiber 52 is contained in a loose tube 54 made of polymeric material. Regardless of which embodiment of the tape is used, the tape is generally wrapped helically about the bundle of optical fibers typically by means of a mechanical apparatus. The filament bearing surface of the tape 50 is normally in face-to-face contact with the tubes 54. Preferably, the tape 50 is wrapped helically in both right-hand and left-hand directions. It is preferred that no portion of an individual ribbon of the tape 50 overlap any other portion of that same individual ribbon so that hydrophobic gel can be introduced into the spaces between the helical coils of the tape. After the bundle of optical fibers has been wrapped with the tape of this invention, a jacket 56 is then applied over the wrapped, bundled fibers, typically by an extrusion process.

The following, non-limiting example further describes the tape of this invention.

EXAMPLE I

The backing was 1 mil polyethylene terephthalate film. The back side of the film was coated with a solution of polyurethane low adhesion backsize composition (2.5 percent solids content) of the type described in U.S. Pat. No. 2,532,011, by means of a gravure roller consisting of a 200 line knurled roll. The coating was then dried on a hot drum at a temperature of about 150° F. for about two minutes. The face side of the film was then coated with a solution of natural rubber/hydrocarbon tackifying resin adhesive composition (20 percent solids content) at a weight of 4 grains/4 in.×6 in. by means of a laboratory knife coater. This coating was dried in an oven at a temperature of about 180° F. for about five minutes to form the adhesive layer. Yarns containing about 90 to about 100 filaments each were laminated to the adhesive layer in an amount of 25 yarns per inch disposed in a parallel arrangement. The yarns were 500 denier polyethylene terephthalate. A solution of polymeric composition (40 percent solids content) containing 100 parts styrene-isoprene-styrene block copolymer ("Kraton 1107", Shell Oil Company), 200 parts end block stabilizing resin ("Endex 160", Hercules Incorporated), and 3 parts antioxidant (50% "Inganox 1076", Ciba Geigy; 50% "Cyanox LTDP", American Cyanamid Corporation) was coated over the yarn-bearing surface of the film at a weight of 4 grains/4 in.×6 in. by means of a laboratory knife coater. This coating was dried in an oven at about 180° F. for about five minutes. The film web was then slit and wound into a roll in a conventional manner.

Various modifications and alterations of this invention will become apparent to those skilled in the art without departing from the scope and spirit of this invention, and it should be understood that this invention is not to be unduly limited to the embodiments set forth herein.

What is claimed is:

1. Tape comprising a backing having adhered to at least one major surface thereof by means of a layer of adhesive, a plurality of yarns each of which comprises a multiplicity of filaments, said yarns being spaced apart, said at least one major surface being coated with a polymeric material in an amount sufficient to detackify the adhesive layer between said yarns and to prevent the yarns from unraveling, the coefficient of static friction of the coating formed by said polymeric material being equal to or less than about 2.8, as measured according to ASTM D 1894 (1978).

2. Tape according to claim 1 wherein the surface opposite that bearing the yarns bears a low adhesion backsize coating.

3. Tape according to claim 1 wherein the polymeric material is non-tacky.

4. Tape according to claim 1 wherein the elongation of the filaments is equal to or greater than 10%, as measured in accordance with ASTM D-885 (1985).

5. Cable comprising a plurality of optical fibers, said optical fibers being held in a bundle by at least one ribbon of the tape of claim 4.

6. Tape according to claim 1 wherein the tensile strength of the filaments is equal to or greater than 35,000 lb/sq. in. (2461 kg/sq. cm.), as measured in accordance with ASTM D-885 (1985).

7. Tape according to claim 1 wherein said backing has a thickness of about 0.0127 mm to about 0.127 mm.

8. Tape according to claim 1 wherein the filaments have a diameter of from about 0.005 mm to about 0.015 mm.

9. Tape according to claim 1 wherein the filaments comprise polyester.

10. Tape according to claim 1 wherein the backing comprises polyester.

11. Tape according to claim 1 wherein the adhesive is a pressure-sensitive adhesive.

12. Tape according to claim 1 wherein the polymeric material is styrene-isoprene-styrene block copolymer and aromatic hydrocarbon end block reinforcing resin.

13. Tape according to claim 1 wherein said yarns have an elliptical cross-section, the major axis of which is essentially parallel to said backing.

14. Tape comprising a backing have adhered to at least one major surface thereof by means of a layer of adhesive a multiplicity of filaments, said filaments being spaced apart, said at least one major surface being coated with a polymeric material in an amount sufficient to detackify the adhesive layer between said filaments, the coefficient of static friction of the coating formed by said polymeric material being equal to or less than about 2.8, as measured according to ASTM D 1894 (1978).

15. Tape according to claim 14 wherein the surface opposite that bearing the yarns bears a low adhesion backsize coating.

16. Tape according to claim 14 wherein the filaments comprise polyester.

17. Tape according to claim 14 wherein the adhesive is a pressure-sensitive adhesive.

18. Tape according to claim 15 wherein the elongation of the filaments is equal to or greater than 10%, as measured in accordance with ASTM D-885 (1985).

19. Cable comprising a plurality of optical fibers, said optical fibers being held in a bundle by at least one ribbon of the tape of claim 18.

* * * * *